D. K. ALLISON.
MACHINE FOR MOLDING AND BALLING DOUGH AND THE LIKE.
APPLICATION FILED JULY 27, 1914.
1,192,973.
Patented Aug. 1, 1916.
2 SHEETS—SHEET 1.
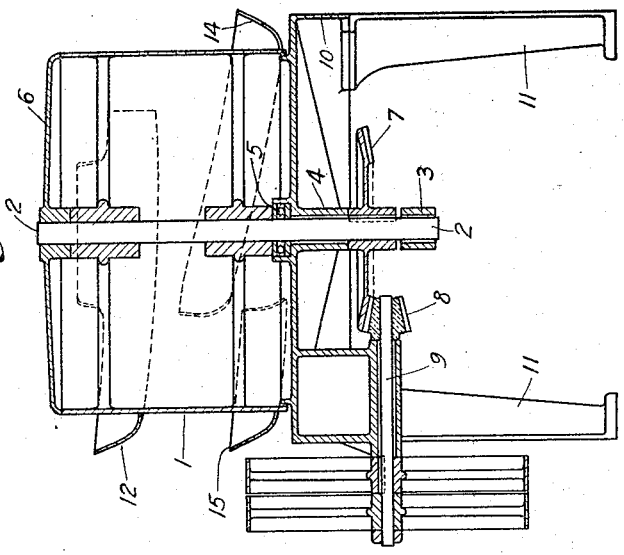
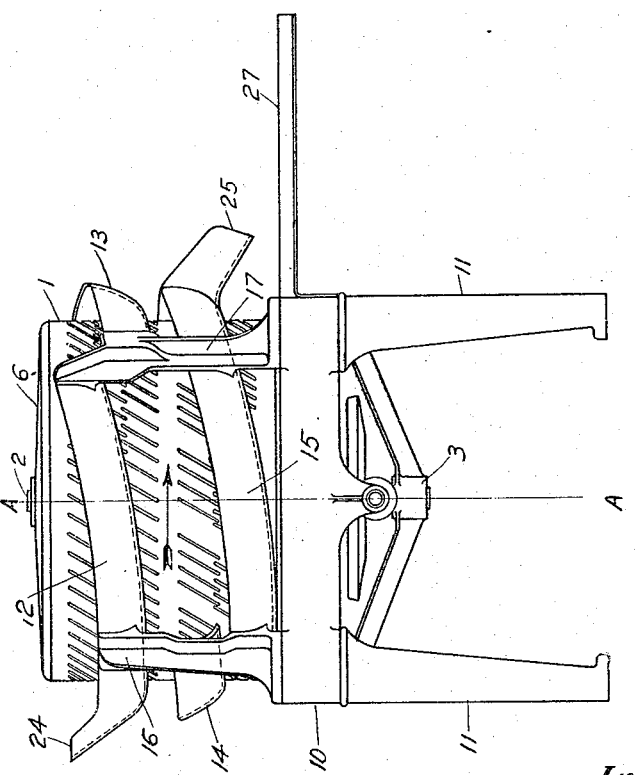
Witnesses
Inventor
Daniel K. Allison D. K. ALLISON.
MACHINE FOR MOLDING AND BALLING DOUGH AND THE LIKE.
APPLICATION FILED JULY 27, 1914.
1,192,973.
Patented Aug. 1, 1916.
2 SHEETS—SHEET 2.
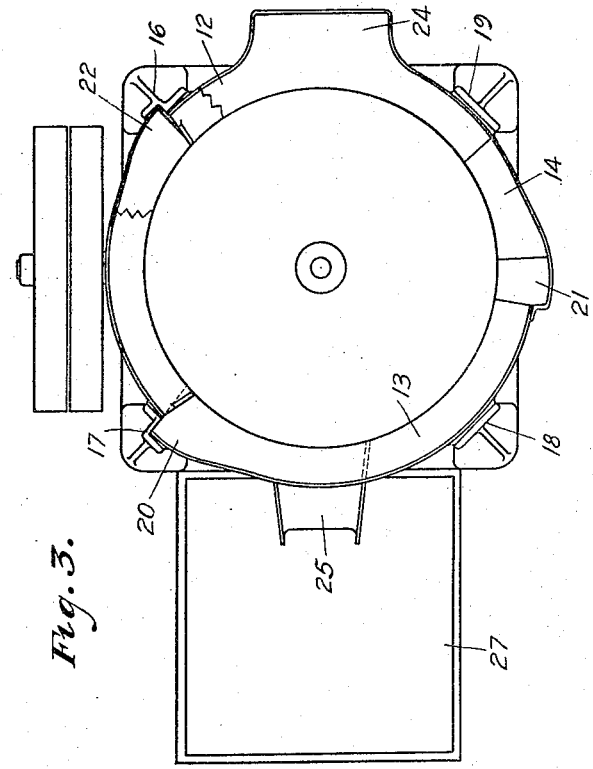
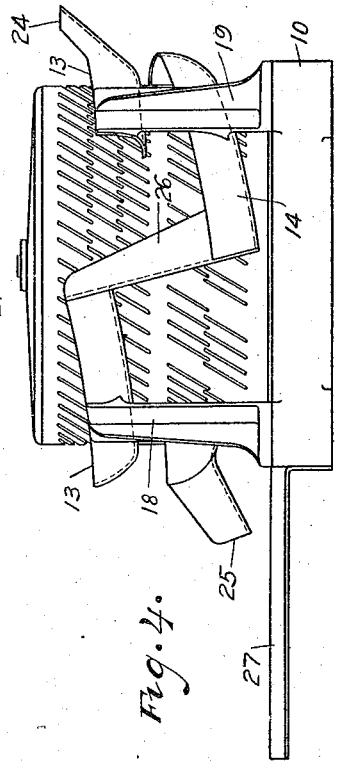
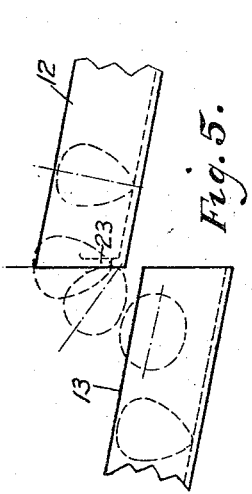
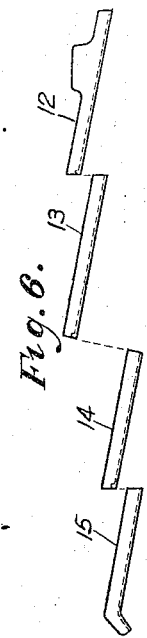
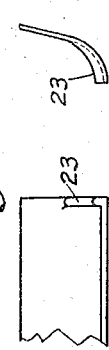
Witnesses
Inventor
Daniel K. Allison

UNITED STATES PATENT OFFICE.

DANIEL K. ALLISON, OF CINCINNATI, OHIO, ASSIGNOR TO THE J. H. DAY COMPANY, OF CINCINNATI, OHIO, A CORPORATION OF OHIO.

MACHINE FOR MOLDING AND BALLING DOUGH AND THE LIKE.

1,192,973. Specification of Letters Patent. Patented Aug. 1, 1916.

Application filed July 27, 1914. Serial No. 853,269.

*To all whom it may concern:*

Be it known that I, DANIEL K. ALLISON, a citizen of the United States, and resident of Cincinnati, in the county of Hamilton and State of Ohio, have invented certain new and useful Improvements in Machines for Molding and Balling Dough and the like, of which the following is a specification.

The invention relates to improvements in machines for molding and balling dough and its object is to provide a machine into which lumps or masses of dough may be deposited and which shall so act upon the said masses as to roll them into ball shapes and at the same time so work upon the surface of said dough masses as to put thereon a uniform skin or surface.

The novel feature of my invention will be particularly pointed out in the specification and claims.

By referring to the drawings Figure 1 represents a side elevation of my invention; Fig. 2 is a vertical cross section of my machine taken on the line A—A of Fig. 1; Fig. 3 is a plan view of the machine; Fig. 4 is a side elevation of the upper part of the machine, showing the opposite side to that shown in Fig. 1; Fig. 5 is a diagrammatical view of contiguous portions of the dough trough; Fig. 6 shows a development of the dough trough, very much reduced in scale; Fig. 7 shows the discharge end of one of the troughs.

The cylinder 1 is mounted upon the vertical shaft 2 which in turn is supported in the bearings 3 and 4. Just above said bearing 4 is a ball thrust collar 5 which supports the weight of said cylinder and eliminates friction. The upper end of said cylinder is closed with a cap 6 to prevent dirt from collecting within the said cylinder. The surface of said cylinder is provided with a number of grooves cut into its surface on an angle with the axis of said cylinder. The angle of said grooves is so determined that the upper parts thereof lean toward the direction of rotation of the cylinder. The shaft 2 is driven by the gear 7 and pinion 8 which in turn is keyed to horizontal shaft 9 which may be driven in any suitable manner. I have shown pulleys for this purpose in the drawing. To support said shaft and gearing I have provided a suitable frame 10 supported by suitable legs 11. Adjacent to said cylinder 1, I have arranged a plurality of inclined troughs. For the purpose of description I will number the first trough 12, the second trough 13, the third trough 14 and the fourth trough 15. I have elected to use four troughs in this case but the number of troughs is not material to the invention, as a greater or less number may be used without departing from the scope of my invention. The various troughs are held in place by suitable upright standards 16—17—18 and 19. Sectional views of said troughs are shown in Fig. 2. In Fig. 6 I have shown a development of the troughs in order to make it clear that all the troughs have about the same pitch or incline. The construction of said troughs is such that the masses of dough are confined by the cylinder on the inside and by the troughs on the outside. This construction is not new. The arrangement of said troughs is such that the discharge end of each trough is elevated above the intake end of the next succeeding trough. This feature is shown in Fig. 6. The intake ends of trough sections 13, 14 and 15 are made wider in cross section as shown at 20, 21 and 22 respectively. The discharge ends of the troughs are provided with a rib 23 as shown in Figs. 5 and 7. I have arranged the troughs in two sections, an upper and a lower section. Troughs 12 and 13 comprise the upper section and are arranged in substantially the same horizontal plane; troughs 14 and 15 comprise the lower section and are likewise arranged in substantially the same horizontal plane.

In operating the machine the cylinder 1 is caused to rotate in the direction of the arrow shown in Fig. 1 and dough masses are deposited into the first trough 12 at its mouth 24. Said masses immediately drop into the lower part of said trough where they are engaged by the grooved surface of the rotating cylinder 1, which rolls said masses into shapes as indicated by dotted lines in Fig. 5. When said dough masses reach the end of trough 12 they fall by gravity into the intake end of trough 13 and in so falling they turn over about ninety degrees on an axis perpendicular to the axis of the cylinder. This turning is brought about by the rib 23. The lower part of the dough masses are retarded by said rib and are prevented from slipping out of the upper trough. On that account the cylinder causes the masses to turn about the rib 23 as an axis and roll over said rib in falling. While said dough masses are traveling in trough 12 the dough is under lateral compression and when said masses fall out of said trough they become free from lateral pressure and they expand and increase very materially in size; so much so, that the portion of the trough below into which they fall is required to be made wider in cross section to receive the expanded mass of dough. It will be noted that the dough masses while in trough 12 are being rolled about a certain axis as indicated by dotted straight lines in Fig. 5, that they will be rolled about a new and different axis when the rolling begins in trough 13. This falling and turning operation is repeated when the dough masses fall out of trough 13 into 14 and again out of trough 14 into 15. It will be noted that the drop from troughs 13 to 14 is very much greater than at the other two points. This increased drop is not material but is merely incidental to the construction shown. At this drop point I have provided a chute 26 to insure falling into the lower section. This chute 26 is closed on two sides and has one side open. This open side permits the dough mass to fall freely. This construction and arrangement of troughs coöperating with the moving cylinder effects a complete rolling of the dough masses. The dough masses are deposited into trough 12 near the upper part of said cylinder and after rolling in each trough and falling from trough to trough it is finally discharged at a point near the lower part of the cylinder through the chute 25 onto the table 27. This successive rolling and turning of the dough masses serves to give to the surface of the dough a smoother and more uniform finish than is possible with other machines heretofore invented.

Having described my invention, what I claim and desire to secure by Letters-Patent is:

1. In a machine for molding and balling dough, a revolving cylinder and a plurality of inclined troughs adjacent to the said cylinder arranged in upper and lower sections, the troughs of the upper section being in substantially the same horizontal plane, and the troughs of the lower section being likewise in the same horizontal plane, and the intake end of each successive trough being arranged beneath the discharge end of the preceding trough.

2. In a machine for molding and balling dough, a revolving cylinder, a plurality of inclined troughs arranged in succession around said cylinder, forming a path in one direction in which the dough is rolled, molded and balled; the discharge end of each trough being located above the intake end of its succeeding trough and a rib construction arranged in the discharge end of each trough for the purpose of retarding the lower part of the dough ball and compelling it to turn over while falling into the intake end of the succeeding trough.

3. In a machine for molding and balling dough a revolving cylinder, a plurality of inclined troughs arranged in succession about said cylinder, the discharge end of each trough being above the intake end of the succeeding trough and also arranged so that the dough mass is propelled in the same general direction in its circuit through the machine, and ribbed means interposed between the troughs for the purpose of retarding the dough mass in a manner to compel it to turn over in falling from trough to trough.

4. In a machine for molding and balling dough, a revolving cylinder, a plurality of inclined troughs adjacent to said cylinder and arranged in succession about the same in a manner to provide a continuous path in the same general direction in which the dough mass is rolled and balled; a ribbed construction interposed between the said troughs for the purpose of retarding the progress of the dough mass and thereby causing it to turn over in falling, and an enlargement of the intake ends of the said troughs for the purpose of receiving the expanded dough mass in its turned position.

DANIEL K. ALLISON.

Witnesses:
IRWIN L. KOHLMANN,
KRIEGER W. HENDERSON.

Copies of this patent may be obtained for five cents each, by addressing the "Commissioner of Patents, Washington, D. C."